INVENTOR.
RONALD E. REITMEIER
& HAROLD W. FLEMING

THEIR ATTORNEY

3,388,972
LOW TEMPERATURE SHIFT REACTION CATALYSTS AND METHODS FOR THEIR PREPARATION

Ronald E. Reitmeier, Middletown, and Harold W. Fleming, Jeffersontown, Ky., assignors to Catalysts & Chemicals Inc., Louisville, Ky., a corporation of Delaware
Continuation-in-part of application Ser. No. 498,113, Oct. 19, 1965. This application Dec. 14, 1966, Ser. No. 601,657
14 Claims. (Cl. 23—213)

ABSTRACT OF THE DISCLOSURE

Water gas shift reactions, the reaction of carbon monoxide with steam, are favored by low temperature operations, but occasionally are subjected to abnormal temperature increases. Increases in temperature have been injurious to low temperature shift catalysts. A shift catalyst suitable under such conditions contains copper, zinc oxide and alumina. The zinc to copper weight ratio is 0.5 to 3 zinc to 1 copper, and the catalyst contains 1 to 55 percent alumina based on the copper oxide-zinc oxide-alumina precursor.

---

Figure 1:
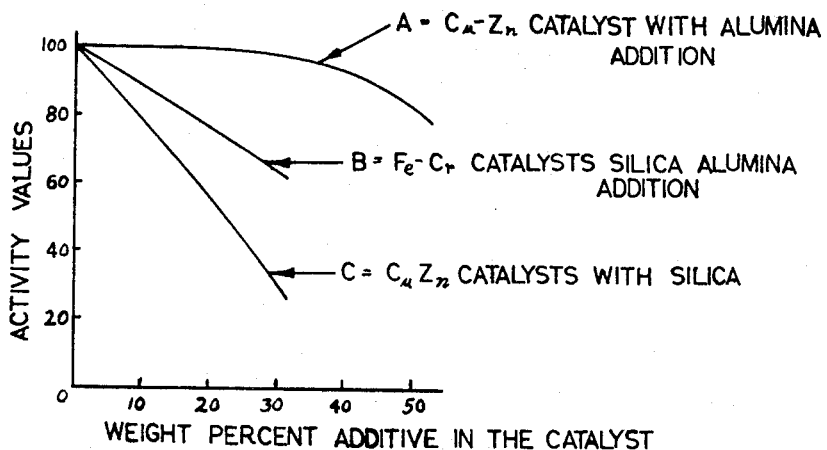

This application is a continuation-in-part of our application Ser. No. 498,113 filed Oct. 19, 1965, now abandoned.

This invention in one of its aspects pertains to catalysts for low temperature shift reactions. In another of its aspects this invention relates to methods for preparing low temperature shift reaction catalysts. In still another of its aspects the invention relates to shift reactions, which can be conducted below 700° F.

The most important uses of hydrogen today are its use in the petrochemical industry, and in the synthesis of ammonia. To produce hydrogen for these purposes a gas reforming process is generally used. In gas reforming, natural gas, or a low molecular weight hydrocarbon such as methane, ethane, propane, or naphtha is reacted with steam. Steam and hydrocarbons when passed over a catalyst containing certain metals such as a metal of the iron group, form hydrogen, carbon monoxide and carbon dioxide. In a second stage of this well known and commercial process for hydrogen preparation, the process is operated to bring about a water gas shift reaction by which carbon monoxide and water, or steam, are reacted to form carbon dioxide and additional hydrogen. The carbon monoxide must be thus converted to carbon dioxide to improve the yield of hydrogen from hydrocarbon and to enable purification to a relatively high purity hydrogen since carbon dioxide is readily removed from the gas whereas carbon monoxide is more difficult to remove.

To produce pure hydrogen from water gas, or other carbon monoxide containing gases and steam, it is the practice to pass the water gas over a shift catalyst, the following reaction occurring:

The temperature at which this reaction is generally carried out is above 650° F., say 700° F. up to 1000° F. Although the life of the conventional iron-chrome catalyst is satisfactory when the reaction is carried out at temperatures above 700° F., the catalyst life is not satisfactory when the reaction is carried out at temperatures much below 700° F. Hence the temperature employed is 700° F. and above for these catalysts. However, these required high temperatures do not favor the above equilibrium. The equilibrium shifts to the right, that is, to the production of hydrogen, as the temperature is decreased.

In order to overcome this difficulty it has been the practice to increase the amount of steam in order to shift the equilibrium in the desired direction. Our earlier application Serial No. 498,113 filed Oct. 19, 1965, was based on the catalysts which not only favor the equilibrium by permitting the water gas shift reaction to be carried out at temperatures as low as 350° F., but they are also effective at higher temperatures. This is important where high pressure systems are to be used. It has been found that the catalysts can be operated at temperatures in the range of 550° F. to 700° F. with no loss of activity such that higher pressures can be used without condensation occurring on the catalyst, as would be the case at lower temperatures due to the steam partial pressure.

Catalysts formerly employed in a water gas shift reaction have been iron-chromium catalysts such as $Fe_2O_3$ in combination with 1 to 15 percent by weight of $Cr_2O_3$. However, the use of a reduced copper oxide-zinc oxide catalyst ($CuO \cdot ZnO$) is disclosed for this purpose in Ser. No. 330,542, now U.S. Patent No. 3,303,001. It was found that if a copper oxide-zinc oxide catalyst was made by a specific technique following the teachings of that invention, a copper oxide-zinc oxide catalyst resulted, which when reduced to zinc oxide and copper permitted a high conversion of carbon monoxide in water gas to hydrogen and carbon dioxide not only at a temperature of 550° F., but lower, preferably 350° F. to 500° F.

Since the catalysts of U.S. Patent No. 3,303,001 favor a low temperature shift reaction with its more desirable equilibrium they have become highly successful commercially, and they are in use throughout the world. However, they nevertheless are subject to further improvement. Thus, continued use of the copper-zinc oxide catalysts under varying conditions in a variety of plants has shown them to be quite sensitive to temperatures at the upper end of their useful temperature range. For example, being sensitive to higher temperatures, copper-zinc oxide catalysts will not take temperatures in the upper range, for example at 500° F. to 700° F. or higher for very long periods of time. The surface area decreases; activity is lost; and the life of the catalyst is reduced. Catalyst life is thus sometimes reduced by abnormal plant conditions which result in a high temperature. An increase in the temperature often does not result in an increase of the activity of the catalyst as would be expected. One condition which may often occur is an almost instantaneous overheating which rapidly occurs due to an upset condition in the plant, the temperature returning to normal within a few hours. Since the shift reaction is exothermic, when for some reason an excessive amount of carbon monoxide gets into the process feed stream the temperature rises rapidly. Such overheating is irreparably injurious to the catalyst, causing it to lose activity, and shortening its life.

This invention pertains to a modification of the copper-zinc oxide catalyst to improve its thermal resistance and to increase its activity.

According to this invention, the desired high activity and faster reaction rate of zinc-oxide catalysts at low temperatures are further increased, and the adverse high temperature effect on the copper-zinc oxide catalyst is also overcome. Thus the catalyst of this invention is not appreciably deactivated even if the temperature periodically rises to as high as 700° F. Copper-zinc catalysts are therefore vastly improved by the invention.

An object of this invention, therefore, is to produce a longer life, low temperature copper-zinc shift catalyst of greater activity.

Another object of this invention is to produce a catalyst which can be operated at higher pressures requiring a temperature of 550° F. to 700° F., and which can be heated to high temperatures caused by plant upsets without seriously reducing the activity of the catalyst when the temperature returns to normal.

Still another object of the invention is to produce a low temperature copper-zinc catalyst of improved physical characteristics.

According to the practice of this invention it has been found that not only the thermal resistance, but physical properties such as surface areas and crush strength valves, of copper oxide-zinc oxide catalyst precursors are improved by the combination of copper and zinc oxides, derived from carbonates, with a selected quantity of alumina as a modifier. The catalyst precursor is reduced to form the modified low temperature shift catalyst. The precursor contains a mixture of zinc oxide and copper oxide such that zinc and copper are present in a weight ratio based on metal of 0.5 to 3 zinc to 1 copper, desirably 2 zinc to 1 copper. The quantity of alumina sufficient to confer improved thermal resistance and greater activity on the finished catalyst is at least one percent. Normally the activity declines beyond fifty percent alumina in the finished catalyst. Hence, more than about fifty-five percent is undesirable.

In our earlier filed copending application Serial No. 498,113 we described and claimed catalysts containing 1 to 55 percent alumina based on the copper oxide-zinc oxide-alumina combination. The optimum amount of alumina within this range now has been found to be larger than originally determined. The purpose of the present application is to specifically claim this preferred embodiment.

Alumina catalysts have been made which contain copper and zinc. However, such catalysts are predominantly alumina, and, more important, they have not been used in water gas shift reactions. Additives such as alumina and silica heretofore have been considered detrimental to shift reactions. This is best illustrated by FIG. 1.

FIG. 1 gives the results of activity data with arbitrary value of 100 having been assigned to the initial on-stream activity.

In FIG. 1 the scale is graduated downwardly from the assigned 100 initial value to show the decline in activity with the percent alumina added to in the catalyst. FIG. 1, curve A, shows that when alumina is incorporated in the copper zinc catalyst the activity drops only slightly, about to an inclusion of about 40 percent, based on the precursor, and then drops more gradually when up to 55 percent alumina is incorporated. However, when silica or alumina is added to the conventional iron-chrome shift catalyst, curve B, there is an immediate drop in activity. Even with 10 percent added the activity drops from its base value of 100 to 90, and the decrease in activity is almost directly proportional to the amount of alumina, or silica, added. Curve C of FIG. 1 shows that when silica is incorporated in the copper-zinc catalyst the decline in activity from the 100 initial value is even more sharp. This is commercial data, the catalysts having been prepared as in Example 2 hereinafter.

Several methods can be employed for combining the alumina with the two carbonate derived metal oxides. However, these can best be explained after a discussion of basic preparation processes. According to one method of preparing copper oxide-zinc oxide catalyst precursors, mixtures of solutions of soluble copper and zinc salts, for instance their chlorates, chlorides, sulfates, nitrates and acetates, are coprecipitated as carbonates in amounts resulting in the desired copper-zinc ratios. It is generally preferred to employ the nitrates, and to coprecipitate by the addition of sodium carbonate. Thus a dilute aqueous solution of the copper and zinc salts is combined with a dilute aqueous solution of sodium carbonate, forming the coprecipitate by double decomposition. Usually it is the practice to add the sodium carbonate solution to the copper-zinc salt solution. In other words the basic substance is added to the acidic substance. However, in one aspect of U.S. Patent No. 3,303,001 the acidic material is added to the basic material.

Another aspect of U.S. Patent No. 3,303,001 concerns the alkali metal level in the catalyst. The quantity of sodium present in the final catalyst as the oxide markedly affects the performance of the copper-zinc catalyst. As set forth in U.S. Patent No. 3,303,001 the sodium content of the copper-zinc catalyst is not to exceed 0.2 percent based on metal. Preferably it does not exceed 0.05 percent based on sodium metal. To remove sodium contaminants the precipitated carbonates are washed, either by repeated decantation, by the use of conventional thickening apparatus or by calcining the cake to the oxides and then reslurrying the oxides with water and filtering.

Preferred methods for preparing the catalysts of this invention are modifications of the best methods used in the preparation of copper-zinc catalysts described above and set forth in U.S. Patent No. 3,303,001. Thus, various methods are available, it being understood that the copper and zinc must be coprecipitated as carbonates. One method of incorporating alumina is to add an aluminate such as sodium aluminate to the sodium carbonate precipitant. The copper and zinc carbonates and the alumina are then all precipitated when the metal nitrate solution is pumped into the sodium carbonate solution. If sodium aluminate is not used, alumina hydrate can be added at any stage after the copper and zinc carbonates have been precipitated. Thus the alumina can be added directly after the precipitation. However since the precipitate is washed several times to remove sodium, it is preferred to add the alumina after the sodium is washed out, and just before the copper and zinc carbonates are filtered. The alumina can also be added after the copper and zinc carbonates are calcined, when the calcined carbonates are reslurried to remove the last traces of sodium.

Another point of alumina addition is just before tabletting when calcined copper and zinc carbonates, which are now oxides, are to be mixed with the proper quantity of water before tabletting. Alumina may be added at this point. It is also possible to add alumina instead of sodium aluminate with the sodium carbonate before the metal nitrates are pumped into the sodium carbonate solution. Alumina added at this point will not react with the sodium carbonate at the temperature employed. When the alumina is added per se it will generally be added as alumina hydrate, which may contain anywhere from ½ to 3 molecules of water of hydrate per molecule of $Al_2O_3$.

The aluminas contemplated herein are any of the commerically available catalytic aluminas. By catalytic alumina is meant the variety of transitional aluminas which are available for catalysts. Transitional aluminas are metastable forms which, in general, are produced by the heating of alpha or beta alumina trihydrates, or monohydrates. As each of these starting materials, or any mixture thereof, is heated, phase changes take place. A number of intermediate or transitional alumina phases are formed. These are characterized by being only partially or poorly crystalline. They are partly amorphous and partly crystalline. In the overall transitional of alpha and beta alumina, several different transitional aluminas result. The names assigned to the various transitional aluminas are gamma, delta, eta, theta, kappa, chi and rho. The alpha monohydrate itself is, in a sense, a transitional alumina, since it is a product reversibly obtained on heating of either alpha or beta alumina trihydrate under suitable conditions of temperature and time. In addition to these transitional forms described above, there is a truly amorphous alumina characterized by having no definite X-ray diffraction pattern. Upon heating its structure can also be converted to other forms of transitional alumina. This invention thus contemplates transitional aluminas activated by calcining or otherwise heating with steam or air, etc., to raise the surface area to above 50 square meters per gram, preferably in the range of 200 to 400 square meters per gram. Alumina devoid of water of hydration can be used in any of these preparations, but the hydrate is preferred because of the tabletting characteristics of the powder containing the alumina hydrate. A non-hydrated alumina such as commercially available activated alumina or other calcined alumina will cause tool wear and lead to a more costly operation.

The various methods of preparing the catalysts of this invention, and advantages of these catalysts over unmodified copper-zinc catalysts can best be illustrated by specific examples. A preparation of the unmodified copper-zinc catalyst is first exemplified for the purpose of comparison.

EXAMPLE 1

In a commercial unit a copper-zinc catalyst is produced by pumping 565 cubic feet of a solution containing 918 pounds of copper as copper nitrate and 1890 pounds of copper as copper nitrate and 1890 pounds of zinc as zinc as zinc nitrate (specific gravity approx. 1.180) into a 15.7 percent solution of soda ash (light). The volume of the soda ash solution is 450 cu. ft. (Theoretical weight of precipitate—3500 lbs.) The soda ash solution is pumped into a 1695 cu. ft. tank equipped with a mechanical agitator and heated to 140° F. The copper-zinc solution is heated at 110 °F. and sprayed over the surface of the soda ash solution. The soda ash solution is maintained at 140° F. to 142° F. during this precipitation reaction by sparging with live steam. The final pH of the mixture is 7.0 to 8.5. After precipitation the batch is washed to remove sodium by decanting off approximately 80 percent of the solution in the precipitation tank. The wash temperature is approximately 90° F. Four washes are used in this decantation as follows: 1st—595 cu. ft.; 2nd—1310 cu. ft.; 3rd—1310 cu. ft.; and 4th—1310 cu. ft. After the fourth decantation the material is filtered and then loaded on racks and calcined at 700° F. to a weight loss of 1 percent or less. At this point the sodium content is 0.10 to 0.15 percent. The calcined material is reslurried by suspension in water (3500 lbs. of the oxides in 1695 cu. ft. of water) at 90° F. to 100° F. The resulting mixture is filtered out of the slurry and dried to 1 percent or less weight loss at 352° F. The sodium content at this point is 0.05 percent or less. The dried filter cake to which 2 percent graphite is added as a lubricant is then sized and formed into ¼ inch tablets. Catalyst properties (on reduced pellets): sodium=0.03; $K_w$ at 400° F.=11,700; surface area 44; pellet size ¼ inch; pellet density 80 (lb./sq. in.); pellet crush strength (DWL-lbs.) 20.

The $K_w$ used herein is an activity constant. It is a simplified form of a reaction rate constant for a first-order reaction. This constant is discussed in Chemical Process Principles, Part III by Olaf Hougan and K. Watson, John Wiley & Sons, Inc., 1947, and in I & EC, vol. 41, August 1950, p. 1600. As used herein:

$$K_w = SV_w \log_{10} \frac{1}{1-\text{fraction of Theoretical Conversion}} =$$

$$SV_w \log_{10} \frac{CO \text{ in} - CO \text{ at equilibrium}}{CO \text{ out} - CO \text{ at equilibrium}}$$

$SV_w$ is the wet space velocity defined as the total volume of wet gas measured in standard cubic feet (s.c.f.) (i.e., at 1 atm. and 60 °F.) per hour per cubic feet of catalyst. In other words, this is the time term in the reaction rate constant expression. The CO in the above expression can be expressed in any units as long as the units are consistent for the CO concentration in the inlet, CO in the outlet, and CO at equilibrium. The constant $K_w$ may not adequately express the true mechanism of the shift reaction over the catalysts in mathematical terms. However, it has been found to be a reliable means of expressing the activity from bench scale tests and for designing commercial units. This is true for the range of conditions under which the catalysts are being operated today. The calculation of reaction rate constants for the water-gas shift reaction from expressions set forth by other observers has either yielded essentially no differences in the volumes that would be calculated for the required performance by the $K_w$ expression, or, are less satisfactory.

The conversions herein for the most part were determined at 400° F. for $CO+H_2O \rightleftharpoons CO_2+H_2$. Hence $K_w$ conversions were obtained in an isothermal reactor comprising a jacketed iron pipe under the following conditions. The catalyst was first reduced by treatment for about eight hours at 500° F. with a mixture of 2 percent $H_2$ in $N_2$. The $K_w$ values of the catalyst contemplated herein are above 9000.

Process conditions

| | |
|---|---:|
| Pressure, p.s.i.g. | 150 |
| Temperature, ° F. | 400 |
| Space Velocity, dry | 4500 |
| Space Velocity, wet | 9000 |
| Steam-Gas Ratio (molar ratio) | 1:1 |

Gas mixture

| | Percent by vol. |
|---|---:|
| Carbon monoxide | 25 |
| Hydrogen | 75 |

EXAMPLE 2

Following the procedure set forth in Example 1, a catalyst is made by combining 578 parts by weight of $Zn(NO_3)_2 \cdot 6H_2O$ and 383 parts by weight $$Cu(NO_3)_2 \cdot 6H_2O$$

with the same amount of water used in Example 1. To the calcined reslurried suspension of copper and zinc oxides sufficient alumina is added as $Al_2O_3 \cdot H_2O$ so that the quantity of $Al_2O_3$ is 16.7 percent of the copper oxide-zinc oxide-alumina composition. Catalyst properties (on reduced pellets): $K_w$ at 400° F.=13,450.

EXAMPLE 3

Composition of catalyst (weight percent): 33.33 copper oxide; 50.00 zinc oxide; 16.67 alumina.

Materials

Solution No. 1: 130 gms. ZnO, 293 gms. $HNO_3$ (69 to 71 percent $HNO_3$), 68.7 gms. Cu as $Cu(NO_3)_2$ (equivalent to 86 gms. CuO).

Solution No. 2: 50% $NaAlO_2$ solution.

Solution No. 3: 267 gms. $Na_2Co_3$ in 1500 ml. of $H_2O$.

Preparations of solutions

Solution No. 1.—The 130 grams of ZnO are dissolved in 293 grams of 70% $HNO_3$. The 68.7 grams of copper as $Cu(NO_3)_2$ are then added and solution diluted to a volume of 2170 ml. with tap water (ambient temp.).

Solution No. 2.—To prepare this solution 75 grams of 50% NaOH are heated to 250° F. Sixty-six grams of $Al_2O_3 \cdot 3H_2O$ are added slowly and the mixture agitated until all the $Al_2O_3$ has dissolved to form the aluminate ($2NaOH+Al_2O_3 \rightarrow 2NaAlO_2+H_2O$).

Solution No. 3.—The 267 grams of $Na_2CO_3$ is dissolved in 1500 ml. $H_2O$.

Preparation of catalyst

The sodium aluminate solution (Solution 2) is added to the sodium carbonate solution (Solution 3). The mixture is then diluted to a total volume of 2380 ml. and heated to 140±5° F. The coprecipitate of alumina, plus zinc and copper carbonates is obtained by adding Solution 1 to the mixed No. 2 and No. 3 solutions at the rate of 45 to 55 ml. per minute at 140° F. Agitation is maintained throughout the precipitation process. After precipitation is complete the slurry is diluted to 5000 ml. and filtered. The pH should be between 7 and 8 prior to filtration. The green filter cake is then reslurried with water at 90° F. (total volume=5000 ml.) and filtered again. This is repeated two times. Agitation times of 30 minutes are used with each reslurry of green cake. The purpose of reslurrying or washing the green filter cake is to remove the sodium. Before washing the sodium content will range from 6 to 8 percent. After 2 washings the sodium content will be down to 0.2 to 0.5 percent sodium. The washed filter cake is now dried and calcined at 700° F. for 16 hours. The theoretical weight of the calcined oxides for this preparation should be 260 grams. The actual recovery was 257.1 grams. Percent sodium based on calcined oxides was 0.35 percent. The calcined oxides are then reslurred again in 6000 ml. of 90° F. water to further reduce the sodium content. It is then filtered, dried and formed into tablets without additional calcination. Catalyst properties (on reduced pellets): sodium=0.045; $K_w$=12,900 at 400° F.; surface area=102; pellet size=3/16; pellet density (lb./cu. ft.)=62; pellet crush strength (DWL)=39.

EXAMPLE 4

Composition of catalyst (weight percent): 33.1 copper oxide; 50.2 zinc oxide; 16.7 alumina.

Materials

Solution No. 1: 130 gms. ZnO; 293 gms. $HNO_3$ (69 to 71%); 68.7 gms. Cu as $Cu(NO_3)_2$; 43.5 gms. $Al_2O_3 \cdot 3H_2O$; dilute to 2170 ml.

Solution No. 2: 315 gms. $Na_2CO_3$—diluted to 2000 ml. with $H_2O$; heated to 140° F.

Preparation of catalyst

Precipitation is accomplished as in Example 3 but by adding the copper-zinc salt solution containing alumina (Solution 1) to the sodium carbonate solution (Solution 2). Catalyst properties (on reduced pellets): sodium=0.03; $K_w$=13,800 at 400° F.; surface area=113; pellet size=3/16 in.; pellet density=48; pellet crush strength (DWL)=20.

EXAMPLE 5

Composition of catalyst (weight percent): 33.1 copper oxide; 50.2 zinc oxide; 16.7 alumina.

Materials

Solution No. 1: 130 gms. ZnO; 68.7 gms. Cu as $Cu(NO_3)_2$; 293 gms. $HNO_3$ (69 to 71%); dilute to 2170 ml.

Solution No. 2: 315 gms. $Na_2CO_3$ diluted to 2000 ml. tap water; heat to 140° F., add 43.5 gms. $Al_2O_3 \cdot 3H_2O$.

Precipitation is accomplished by adding the copper and zinc salt solution (Solution 1) to the alumina-carbonate solution (Solution 2), the remaining procedure being according to Example 3. Catalyst properties (on reduced pellets): sodium=0.04; $K_w$=14,900 at 400° F.; surface area=109; pellet size=3/16 in.; pellet density=65; pellet crush strength (DWL)=24.

EXAMPLE 6

Composition of catalyst (weight percent): 33.33 copper oxide; 61.67 zinc oxide; 5.00 alumina.

Materials

Solution No. 1: 161 gms. ZnO; 363 gms. $HNO_3$ (69 to 71%); 6.7 gms. $Cu(NO_3)_2$.

Solutions No. 2: 49% $NaAlO_2$ solution (made from 23 gms. of 50% NaOH and $Al_2O_3 \cdot 3H_2O$.

Solution No. 3: 342 gms. $Na_2CO_3$ in 1800 ml. $H_2O$.

Preparation of solutions and precipitation is carried out in a manner following Example 3. Catalyst properties: $K_w$ at 400° F. is 15,200; very slight improvement in other properties.

EXAMPLE 7

Composition of catalyst (weight percent): 33.33 copper oxide; 56.67 zinc oxide; 10.00 alumina.

Materials

Solution No. 1: 148 gms. ZnO; 334 gms. $HNO_3$ (69 to 71%); 68.7 gms. Cu as $Cu(NO_3)_2$.

Solution No. 2: 50% $NaAlO_2$ solution (made from 45 gms. of 50% NaOH and 39 gms. of $Al_2O_3 \cdot 3H_2O$).

Solution No. 3: 306 gms. $Na_2CO_3$ in 1800 ml. $H_2O$.

Preparation of solutions and precipitation is carried out according to Example 3. Catalyst properties (on reduced pellets): sodium=0.04; $K_w$=12,000 at 400° F.; surface area=91; pellet size=3/16 in.; pellet density=63; pellet crush strength (DWL)=28.

EXAMPLE 8

Composition of catalyst (weight percent): 33.33 copper oxide; 41.66 zinc oxide; 25.00 alumina.

Materials

Solution No. 1: 108 gms. ZnO; 243 gms. $HNO_3$ (69 to 71%); 68.7 gms. Cu as $Cu(NO_3)_2$.

Solution No. 2: 50% $NaAlO_2$ solution (made from 111 gms. of 50% NaOH and 98 gms. $Al_2O_3 \cdot 3H_2O$).

Solution No. 3: 208 gms. $Na_2CO_3$ in 1300 ml. $H_2O$.

Preparation of solutions and precipitation is carried out following Example 3. Catalyst properties (on reduced pellets): sodium=0.04; $K_w$=10,300 at 400° F.; surface area=141; pellet size=3/16 in.; pellet density=62; pellet crush strength (DWL)=47.

EXAMPLE 9

Composition of catalyst (weight percent): 20 copper oxide; 30 zinc oxide; 50 alumina.

A composition was made according to Example 3, the ingredients being used to give a catalyst of the above percentages. Catalyst properties (on reduced pellets) show less advantage to using this quantity of alumina ($K_w$ at 400° F.=11,000) on activity but thermal properties are vastly improved.

Having illustrated various methods of preparing the catalysts of this invention, the following example illustrates the low $K_w$ value of a catalyst containing the ingredients in the proper ratios, but the catalyst is not prepared from carbonates as required by this invention.

EXAMPLE 10

An activated alumina was mixed with zinc oxide and copper oxide. It was then tabletted to give the following composition: 50 percent zinc oxide; 33.3 percent copper oxide; and 16.7 percent alumina. The finished catalyst had a $K_w$ value of only 99 at 400° F.

Figure 2:
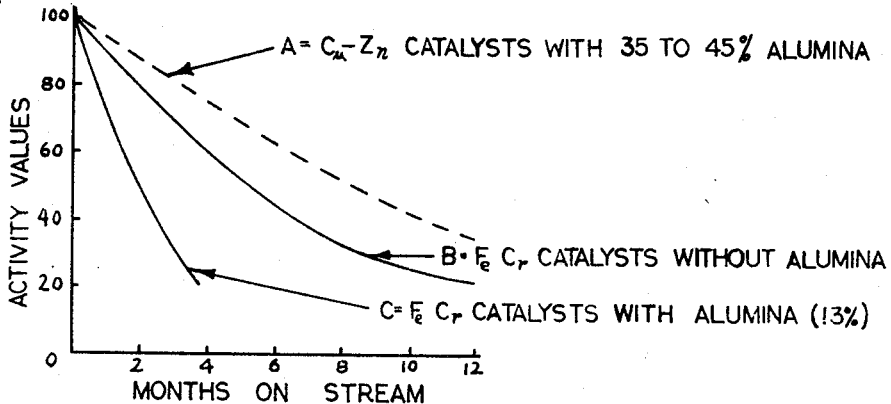

A comparison of Examples 2 through 9 within the scope of this invention, with the unmodified catalyst of Example 1 and the catalyst of Example 10 prepared by a process outside the invention, shows the catalysts of this invention to have outstanding properties including desirable surface areas, crush strengths and excellent $K_w$ values in their optimum compositional ranges. The improvement in catalyst properties is brought about by the formation of a slurry containing alumina even in small amounts. A preferred method of preparation is to coprecipitate copper and zinc as carbonates and to wash the precipitate, particularly if sodium salts are present. The precipitate is then dried and calcined to form the oxides. These oxides are reslurried and the alumina is added thereto. As set forth in Ser. No. 498,113, generally, the percent alumina, P, based on the copper oxide-zinc oxide-alumina combination is $1 \leqslant P \leqslant 55$. However, it has been shown in commercial installations that quantities of alumina in the range of 35 percent to 45 percent alumina based on the zinc oxide-copper oxide-alumina precursor are particularly effective. This is illustrated by FIG. 2, the catalysts having been prepared as follows.

EXAMPLE 11

Composition of catalyst (weight percent): 20 copper oxide; 40 zinc oxide; 40 alumina.

A composition was prepared according to Example 2, the ingredients being used to give a catalyst of the above percentages. The catalyst formed by calcining and reducing the precursor had a $K_w$ value of 12,200.

FIG. 2 shows comparative aging curves in commercial operation of zinc-copper catalysts of the invention containing 35 to 45 percent alumina, compared to conventional iron-chrome catalysts with and without alumina.

Again taking the arbitrary number 100 for the initial activity, it can be seen from curve A of FIG. 2 that in twelve months the activity of catalysts in the 35 to 45 percent alumina range, based on the precursor, drops to a value of 34. As shown in curve B the corresponding value for the conventional iron-chrome catalyst is 20. However, when the iron-chrome catalyst contains only 13 percent alumina the activity drops to 20 in only four months as shown in curve C.

Still another desirable method of expressing the activity coefficient is in terms of weight of gas processed per unit weight of catalyst. This constant will be designated $K_{w_2}$. The equation for $K_{w_2}$ is $$K_{w_2} = (WHSV)_w \log_{10} \frac{CO\ in - CO\ at\ equil.}{CO\ out - CO\ at\ equil.}$$

where $(WHSV)_w$ is the weight hourly space velocity, i.e. pounds per hour of total wet gas processed, per pound of catalyst per hour. $K_{w_2}$ values point out an added advantage of the catalyst of this invention. The alumina addition effectively lowers the bulk density of the catalyst and consequently fewer pounds of catalyst are required to process a given amount of gas to a fixed carbon monoxide conversion.

Having exemplified methods of preparing the catalysts of this invention, results of activity tests are now given in terms of $K_{w_2}$.

To determine activities at different levels, run were made with several additional batches of catalysts prepared by one or more of the examples using various amounts of alumina. These are set forth in Table I in terms of $K_{w_2}$ values.

TABLE I.—METHOD OF EVALUATION
[Dry reduced at 400° F., activity run]

| $Al_2O_3$ concentration (percent): | $K_{w_2}$ at 400° F. |
|---|---|
| 0 | 5.12 |
| 17 | 5.62 |
| 30 | 6.20 |
| 40 | 7.17 |
| 50 | 6.70 |
| 60 | 3.36 |
| 70 | 2.42 |

The data in the foregoing table show that the catalysts of the invention possess higher $K_{w_2}$ values than unmodified catalysts, when alumina is added in quantities to around 50 percent. This is quite surprising in view of the fact alumina is known to be detrimental to the shift reaction. In commercial installations the addition of alumina to conventional iron-chromium catalysts leads to a higher initiation temperature and to a catalyst having a much shorter life. This can be shown by the fact that in these installations the activity of an iron-chromium catalyst has been lessened to two-thirds of its original value and the catalyst life shortened to one-half by the addition of alumina.

Among the advantages of the catalysts of this invention is their thermal stability, including their resistance to steam reduction. Heat stability is best demonstrated by rigid high temperature treatment. These thermostability tests consist of heating the catalyst for 16 hours at various temperatures in the presence of a nitrogen stream containing 3 percent hydrogen. $K_w$ values are then determined during reaction as described hereinbefore. The catalyst was also calcined at various temperatures. Results of these tests are as follows:

TABLE II.—METHOD OF EVALUATION
[Reduction treatment—3 percent $H_2$ in $N_2$]

|  | Catalyst Containing 5.2% $Al_2O_3$, $K_w$ at 400°F. | Catalyst Containing No $Al_2O_3$, $K_w$ at 400°F. |
|---|---|---|
| Red. 400° F | 13,300 | 11,480 |
| Red. 700° F | 12,200 | 6,400 |

[Calcination treatment]

|  | Catalyst Containing 5.2% $Al_2O_3$, $K_w$ at 400°F. | Catalyst Containing No $Al_2O_3$, $K_w$ at 400°F. |
|---|---|---|
| Cal. 600° F | 13,300 | 8,250 |
| Cal. 800° F | 12,900 | 8,100 |
| Cal. 1,000° F | 9,240 | 4,110 |

To further test their thermal stability the catalysts were subjected to a mixture of steam and hydrogen (1 part $H_2$:1 part steam by volume) at 700° F. for sixteen hours. The effect of alumina on thermal stability is best illustrated by reference to FIG. 3.

Figure 3:
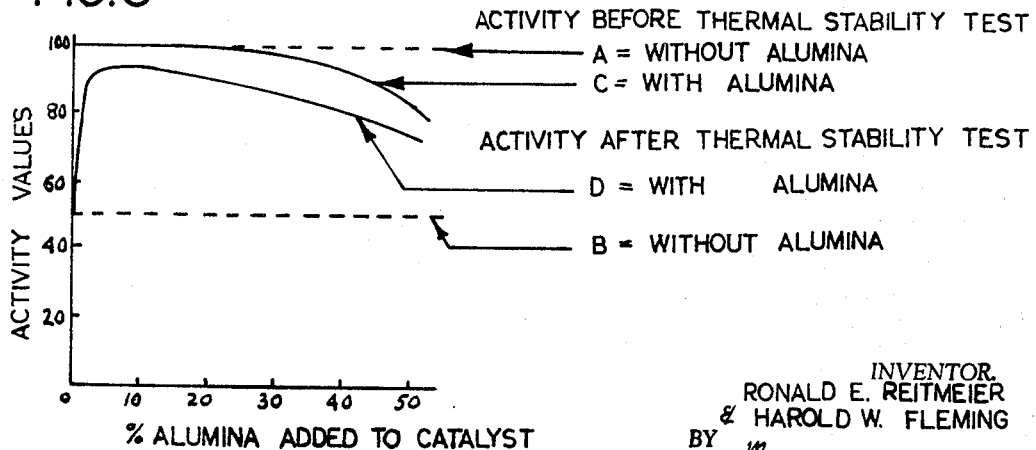

In FIG. 3 catalysts containing alumina, prepared according to Example 2, are compared with the copper-zinc catalyst without alumina.

Referring to FIG. 3 the results of a treated catalyst without alumina are superimposed on the figure as dashed lines even though the quantity of alumina is plotted along the abscissa. Again the initial activity with the catalyst on-stream was assumed to be 100. Curve A shows the catalyst with no alumina operating at this value. After the thermal stability test the activity dropped to a value of about 50 as shown by line B. The catalyst of this invention also began operating at an initial value of 100, which is indicated hereinbefore, drops as the quantity of alumina is increased (curve C). Curve D shows the operation of the catalyst of this invention after the thermal stability test. It can be seen that the drop in activity is much less pronounced, comparing curves B and D. These accelerated tests produce a permanent reduction in both surface area and $K_w$ values. Results in terms of reduction of $K_w$ values are given in Table III. The catalysts were prepared by Example 1 or 3 depending on the presence or absence of alumina.

TABLE III.—METHOD OF EVALUATION
[Conditioned 16 hr. 700° F. with 1:1 $H_2$/steam, activity run—Z]

| Run | Alumina | Initial | After Run Z |
|---|---|---|---|
| 1 | 0 | 10,850 | 6,450 |
| 1 | 31.3 | 14,800 | 10,090 |
| 2 | 0 | 11,400 | 6,200 |
| 2 | 40.0 | 11,030 | 8,900 |
| 3 | 16.7 | 12,900 | 10,680 |
| 4 | 16.7 | 12,760 | 11,760 |
| 4 | 50.0 | 11,000 | 9,350 |

The accelerated tests for thermal resistance show a remarkable improvement in thermal stability. The $K_w$ values drop markedly when the unmodified catalysts are subject to the heat treatment, whereas the $K_w$ values do not drop as far in the case of the modified catalysts. Catalysts of invention thus possess high $K_w$ values initially in the order of 9000 or above, and these $K_w$ values are not greatly lowered by accelerated thermal stability tests. The catalysts containing alumina are more stable and longer lasting than copper-zinc catalysts now known. In addition the catalysts of this invention are more resistant to steam reduction than those without alumina. The $K_w$ value, at 400° F., of the catalyst of Example 3 is 12,900 after a dry reduction but 12,300 after a steam reduction. In the dry reduction 2 percent hydrogen in a nitrogen stream was employed. The wet reduction was carried out with 2 percent hydrogen in a steam stream. As indicated hereinbefore both the copper-zinc ratio and the quantity of alumina can be carried within a fairly wide range. In addition graphite and similar well known lubricants can be incorporated in the catalyst. These and other variations will occur to those skilled in the art, and such ramifications are deemed to be within the scope of this invention, which relates to catalysts consisting essentially of copper, zinc oxide and alumina, precursors of such catalysts and methods of making and using same.

What is claimed is:

1. In a precursor composition which on reduction is a low temperature shift catalyst giving high conversion in a shift reaction at a temperature of about 350° F. to about 550° F. containing a mixture of zinc oxide and copper oxide derived from their carbonates so that on reduction they are catalytic for the shift reaction, said precursor composition containing the zinc oxide and copper oxide in such proportion that the weight ratio of zinc to copper based on metal is about 0.5 to about 3 zinc to 1 copper, that improvement which imparts to the reduced form of said precursor composition resistance to loss of activity at temperatures in the range of about 550° F. to about 700° F., consisting essentially of, as a heat stabilizer, alumina mixed with said precursor composition in amounts in the range of about 5 to about 50 percent of alumina based on the weight of the resulting copper oxide-zinc oxide-alumina mixture.

2. Improvement as claimed in claim 1 wherein alumina is present in said mixture in the amount of about 35 to about 45 percent based on the weight of said mixture.

3. Improvement as claimed in claim 1 wherein alumina is present in said mixture in the amount of about 17 percent based on the weight of said mixture.

4. Improvement as claimed in claim 1 wherein alumina is present in said mixture in the amount of about 25 percent based on the weight of said mixture.

5. Improvement as claimed in claim 1 wherein alumina is present in said mixture in the amount of about 50 percent based on the weight of said mixture.

6. A low temperature shift catalyst resistant to loss of activity at temperatures in the range of about 550° F. to about 700° F. and giving high conversion in a shift reaction at temperatures in the range of about 350° F. to about 700° F. comprising the mixture claimed in claim 1 in reduced form.

7. A low temperature shift catalyst as claimed in claim 6 in which alumina is present in an amount of 35 to 45 weight percent and in which the weight ratio of zinc to copper is 2 to 1.

8. In a process for producing hydrogen by a shift reaction of steam with carbon monoxide in a reaction gas, that improvement which permits said shift reaction to be carried out at a temperature in the range of 350° F. to 700° F. which comprises passing at said temperature in said range, said reaction gas over the alumina containing copper-zinc catalyst of claim 6.

9. A process for the preparation of a copper oxide-zinc oxide shift catalyst resistant to loss of activity at temperatures in the approximate range of 550° F. to 700° F. and which gives high conversions in a shift reaction at temperatures of 350° F. to 700° F. containing as its active ingredients after reduction zinc oxide and copper in a weight ratio based on metal of 0.5 to 3 zinc to 1 copper which comprises forming an aqueous slurry of a mixture of precipitates of copper and zinc as their carbonates with alumina, washing the mixture to remove sodium salts therefrom, and calcining the alumina-copper and zinc carbonate precipitate to form the oxides, said aqueous slurry containing about 5 to about 50 percent alumina based on total oxides of zinc and copper.

10. The process of claim 9 wherein the zinc oxide-copper oxide-alumina is formed from an aqueous suspension of copper and zinc carbonates by mixing these carbonates with alumina.

11. The process of claim 9 wherein the slurry of zinc oxide, copper oxide and alumina results from the addition of alumina to aqueous solutions of soluble copper and zinc salts followed by the addition thereto of sodium carbonate.

12. The process of claim 9 wherein the slurry of zinc oxide, copper oxide, and alumina results from the addition of sodium aluminate to sodium carbonate used to precipitate an aqueous solution of soluble copper and zinc salts.

13. The process of claim 9 wherein the slurry of zinc oxide, copper oxide, and alumina results from the addition of alumina to sodium carbonate used to precipitate an aqueous solution of soluble copper and zinc salts.

14. A process for the preparation of a copper oxide-zinc oxide shift catalyst resistant to loss of activity at temperatures in the approximate range of 550° F. to 700° F. and which gives high conversions in a shift reaction at temperatures of 350° to 700° F. containing as its active ingredients after reduction zinc oxide and copper in a weight ratio based on metal of 0.5 to 3 zinc to 1 copper which comprises coprecipitating copper and zinc as their carbonates from an aqueous solution of their soluble salts, washing the precipitate to remove any sodium salts therefrom, drying and calcining the precipitate to form the oxides, adding water to reslurry the oxides adding about 5 to about 50 percent alumina based on the copper oxide-zinc oxide-alumina combination to the reslurry, and then drying and calcining the reslurry.

References Cited

UNITED STATES PATENTS

| 1,330,772 | 2/1920 | Bosch et al. | 23—213 |
| 1,489,497 | 4/1924 | Larson | 23—213 |
| 1,809,978 | 6/1931 | Larson | 23—213 |
| 1,837,254 | 12/1931 | Dew | 23—213 |
| 1,908,696 | 5/1933 | Dodge | 252—475 |
| 3,303,001 | 2/1967 | Dienes | 23—213 |

FOREIGN PATENTS 961,860  6/1964  Great Britain.

OSCAR R. VERTIZ, *Primary Examiner.*

EDWARD STERN, *Examiner.*